United States Patent Office 2,768,084
Patented Oct. 23, 1956

2,768,084

OIL SOLUBLE SYNERGISTIC ANTIOXIDANT

Carroll L. Griffith, Chicago, and Louis Sair, Evergreen Park, Ill., assignors to The Griffith Laboratories, Inc., a corporation of Illinois No Drawing. Application June 25, 1952,
Serial No. 295,572

3 Claims. (Cl. 99—163)

This invention relates to a fat soluble, synergistic antioxidant containing butylated hydroxyanisole for use in food materials, especially those containing fatty substance.

This application is a continuation-in-part of our co-pending application Serial No. 272,258, filed February 18, 1952, now abandoned.

The antioxidant of this invention is used for stabilizing such food substances as lard, oleo oil, butter, peanut butter, mayonnaise, cheese spreads, vegetable oil, fish oils, hydrogenated fats, milk powder, egg powder, sausage, bacon, oil soluble vitamins, chocolate, cocoa, cocoa butter, coconut fats, essential oils, margarine, lanolin and other fatty food products or food products containing a large amount of fatty material which are subject to rancidity development.

It is well known that oils and fats often become rancid, which in the case of otherwise edible products renders them unfit for human consumption. Some of the constituents of oils and fats are known to possess the tendency to absorb or react with oxygen. Thus, rancidity development results primarily from the products formed during oxidation. The dissolved or absorbed oxygen usually reacts first to form peroxides and the development of peroxides may be further accelerated by moisture, heat, light or a catalyst. Aldehydes, ketones and acids of lower molecular weight may be formed in the further decomposition and these materials impart an undesirable odor or taste to the oil, fat or food product. The evaluation of rancidity is carried out by what is referred to as the Active Oxygen Method (AOM). It pertains to the amount of peroxides developed per kilogram of fat under standard conditions of acceleration. This test is also sometimes referred to as the Swift Stability Test. Figures greater than those for the control indicate antioxidant value.

The antioxidant composition of this invention provides a solution in which a water-soluble antioxidant acid such as citric, tartaric or phosphoric acid is dissolved in an edible oil along with a gallic acid ester, lecithin and butylated hydroxyanisole. Unlike prior antioxidant preparations containing butylated hydroxyanisole which are only dispersed in fats and oils, antioxidant solutions of this invention are fat and oil soluble. Consequently they are very readily distributed uniformly throughout the fats and oils in which they are used and the antioxidant value or keeping qualities of such fats and oils is uniform. The solutions of this invention are excellent antioxidants as they postpone the development of rancidity for a long period of time; contain ingredients which produce a synergistic antioxidant effect when used in fatty food materials; and do not impart color to edible vegetable oils and animal fats in which they are used upon storage, or in the presence of metals such as iron, or upon heating; and inhibit discoloration of the food by any metals with which the food comes in contact.

The solutions of the new composition are quite stable possessing excellent carry through properties when used in such substances as pie crust, crackers, cookies and other fat containing baked products.

To prepare the composition of this invention it is preferred to make up two separate solutions, hereinafter referred to as solutions A and B, which are then mixed together at a temperature of from room temperature to 128° F. Solution A is composed of butylated hydroxyanisole dissolved in an edible oil, and solution B of a water soluble antioxidant acid dissolved in an edible oil in the substantial absence of free water along with a gallic acid ester and lecithin prepared in accordance with the disclosure of Lloyd A. Hall's co-pending application Serial No. 292,993, filed June 11, 1952, now United States Patent No. 2,677,616, issued May 4, 1954. To prevent the ingredients of solution B from separating out after mixing with solution A, it is important that the amount of free water present during the mixing of the two solutions not exceed about 5%.

It is also important that in preparing solution B the amount of free water present not exceed about 5%. If there is any appreciable amount of free water present, either a paste will be formed instead of a solution or distinct liquid layers will be formed when the solution is allowed to stand.

In preparing solution B it is prefered that the temperature be sufficiently high to cause substantially complete dissolving of the constituents, but below the decomposition point of the lecithin. The optimum temperature will vary depending on the constituents employed. The various mixing times and cooling periods should be kept as short as possible.

The gallic acid esters that may be used are methyl gallate, ethyl gallate, propyl gallate, butyl gallate, lauryl gallate, hexyl gallate and combinations thereof, it being preferred to use propyl gallate. The antioxidant acid that is used may be either citric, tartaric or phosphoric acids or combinations thereof. The oil that is used may be any edible oil such as a vegetable oil or lard oil. The preferred oil is corn oil, wheat germ oil, or other oils containing tocopherols as the tocopherols also have an antioxidant action. If desired a tocopherol concentrate of mixed tocopherols may also be added. It is preferred, however, that soya oil not be used as it tends to cause a separation of a heavy sludge. The oils that may be used include corn oil, cottonseed oil, wheat germ oil, various hydrogenated oils, lard oils and mixtures of these or other edible oils.

The antioxidant composition of this invention may be prepared either in regular strength or concentrated form. The preferred proportions for both regular and concentrated strengths, it being understood that the combined water content of the ingredients does not exceed 5%, are as follows:

TABLE I

| | Percent |
|---|---|
| Gallic acid ester | 1.05 to 3.5 |
| Antioxidant acid | 1.7 to 3.7 |
| Lecithin | 12.5 to 22.6 |
| Edible oil | 80.5 to 57.0 |
| Butylated hydroxyanisole | 4.25 to 13.2 |

As an example of the commercial regular antioxidant, excellent results have been obtained with the composition consisting of 1% propyl gallate, 1.75% citric acid, 18% lecithin, 75.25% corn oil and 4% butylated hydroxyanisole in which composition the combined water content of the ingredients is less than about 5%. As to the concentrated antioxidant, excellent results have been obtained with a composition consisting of 3.5% by weight of propyl gallate, 3.7% citric acid, 22.6% lecithin, 57% corn oil, and 13.2% butylated hydroxyanisole in which composition the combined water content of the ingredients is less than about 5%.

In preparing solution B it is preferred that the edible oil be heated and the lecithin, the antioxidant acid, and the gallic ester be added in that order with continuous agitation. When all of the ingredients have been dissolved in the oil, the solution is cooled as rapidly as possible to prevent the formation of a jelly layer and a clear upper oil layer. In a preferred method of preparing the concentrated antioxidant, 55.4 pounds of refined corn oil is introduced into a tank having agitation equipment. The oil is warmed to a temperature of 185° F. and 35 pounds of lecithin is added. The mixture is stirred and then 5.6 pounds of citric acid is added. This mixture is agitated with the temperature being maintained between 175° and 185° F. until substantially complete dissolution is achieved. Five pounds of propyl gallate are then added and the agitation continued within the above temperature range until the propyl gallate is completely dissolved. At the end of this time all of the ingredients have gone into solution in the corn oil. The batch is then immediately cooled as rapidly as possible to a temperature of at least 100° F. This cooling period should not require more than an hour and prolonged heating at higher temperatures should be avoided as this causes the batch to break down with the formation of a jelly layer and a clear upper oil layer.

In preparing solution A, 40 pounds of butylated hydroxyanisole is added to 60 pounds of corn oil and this mixture is stirred until the butylated hydroxyanisole is completely dissolved in the corn oil. 33.3 pounds of this solution is then added to 66.7 pounds of solution B. This mixture is agitated with the temperature being maintained between room temperature and 128° F. until complete uniformity is achieved.

When preparing concentrated solutions of this invention, the ingredients cannot be mixed in a single batch. We have found it necessary to employ the above described method in order to form the stabilized, oil soluble synergistic antioxidant containing butylated hydroxyanisole. However, in preparing regular strength solutions of this invention, the ingredients can be mixed in a single batch to form a stabilized oil soluble synergistic antioxidant containing butylated hydroxyanisole.

The antioxidant solutions of this invention are used in the oil or fat to be stabilized by mixing them into the same at 140° F. to 240° F. in any amounts desired. Excellent results have been obtained with concentrated amounts of from 8 to 12 ounces by weight per 1000 pounds of lard. When a regular strength is employed, from 16 to 24 ounces by weight per 1000 pounds of lard has produced excellent results. None of the solutions impart odor, taste or color to the stabilized fat, oil or food product in which they are used. Toxicity studies have proven that they are non-toxic. The excellent antioxidizing effects of the new composition are illustrated in Table II below in which solutions of this invention are compared with a propylene glycol solution containing butylated hydroxyanisole.

TABLE II

| | A. O. M. Hours | Shelf Life of Crackers—Days at 140° F.—Storage |
|---|---|---|
| Lard No. 1: | | |
| Control | 3 | 9 |
| 10 oz. Concentrated Oil Soluble Synergistic Antioxidant/1,000 lbs | 47 | 23 |
| 12 oz. Concentrated Oil Soluble Synergistic Antioxidant/1,000 lbs | 50 | 24 |
| 8 oz. *Propylene Glycol Solution containing butylated hydroxyanisole | 47 | 23 |
| Lard No. 2: | | |
| Control | 4 | 12 |
| 10 oz. Concentrated Oil Soluble Synergistic Antioxidant/1,000 lbs | 52 | 24 |
| 12 oz. Concentrated Oil Soluble Synergistic Antioxidant/1,000 lbs | 53 | 27 |
| 8 oz. *Propylene Glycol solution containing butylated hydroxyanisole | 53 | 25 |
| Lard No. 3: | | |
| Control | 6 | 14 |
| 8 oz. Concentrated Oil Soluble Synergistic Antioxidant | 50 | 30 |
| 8 oz. *Propylene Glycol solution containing butylated hydroxyanisole | 52 | 29 |

| | Percent |
|---|---|
| *Butylated Hydroxyanisole | 20 |
| Propyl Gallate | 6 |
| Citric Acid | 4 |
| Propylene Glycol | 70 |
| Total | 100 |

It is to be noted that less butylated hydroxyanisole and propyl gallate can be used in the antioxidant solutions of this invention to give approximately the same A. O. M. value and carry through properties to the lard than when the above described propylene glycol antioxidant preparation is used in the same amounts. It is believed that this is due to the synergistic antioxidant properties of the new solution, and is illustrated in Table III below which compares the quantity of ingredients contained in eight ounces of the concentrated oil soluble synergistic antioxidant of this invention per 1000 pounds of lard with those contained in an equal amount of the above described propylene glycol antioxidant containing butylated hydroxyanisole per 1000 pounds of lard.

TABLE III

| Ingredients | Concentrated Oil Soluble Antioxidant of This Invention | Propylene Glycol Antioxidant Composition Containing Butylated Hydroxyanisole |
|---|---|---|
| | Gms. | Gms. |
| Propyl Gallate | 0.0017 | 0.003 |
| Anhydrous Citric Acid | 0.0019 | 0.002 |
| Butylated Hydroxyanisole | 0.0067 | 0.010 |
| Corn Oil | 0.0234 | |
| Propylene Glycol | | 0.035 |
| Lecithin | 0.0113 | |

Butylated hydroxyanisole exists primarily in the form of two isomers 3-tertbutyl, 4-hydroxyanisole and 2-tertbutyl, 4-hydroxyanisole. As used in this specification and the accompanying claims, it is meant to include a mixture of these two isomers.

The foregoing detailed description is given for clearness of understanding only and no unnecessary limitations should be understood therefrom for modifications will be obvious to those skilled in the art.

We claim:

1. The method of making an antioxidant solution which comprises forming a first solution by adding butylated hydroxyanisole to a portion of an edible oil and agitating until substantially all of the butylated hydroxyanisole is dissolved; forming a second solution by adding lecithin to a second portion of said edible oil, agitating until substantially all of the lecithin is dissolved, adding an antioxidant acid of the class consisting of citric, tartaric and phosphoric acids, agitating until substantially all of the acid is dissolved, adding a gallic acid ester of the class consisting of methyl, ethyl, propyl, butyl, hexyl, and lauryl gallates, agitating until substantially all of the ester is dissolved, said second portion of edible oil being maintained at a temperature sufficiently high to dissolve the added ingredients, but below the decomposition point of lecithin during said additions and agitations, and rapidly cooling said second solution; and combining the two solutions by adding one to the other and agitating until substantially complete uniformity is achieved, the temperature of the combined solutions being maintained between room temperature and about 128° F. during this agitation, the amount of free water present during the formation of the second solution and the combining of the first and second solutions being not greater than about 5%.

2. The method as set forth in claim 1 wherein the temperature of the edible oil of the second solution is not substantially above 185° F. during said additions and agitations.

3. The method of making an antioxidant solution which comprises forming a first solution by adding about 40% by weight of butylated hydroxyanisole to a portion of about 60% by weight of an edible oil and agitating until substantially all of the butylated hydroxyanisole is dissolved; forming a second solution by adding about 35% by weight of lecithin to about 55% by weight of a second portion of said edible oil, agitating until substantially all of said lecithin is dissolved, adding about 5.5% of an antioxidant acid of the class consisting of citric, tartaric and phosphoric acids, agitating until substantially all of the acid is dissolved, adding about 5% of a gallic acid ester of the class consisting of methyl, ethyl, propyl, butyl, hexyl and lauryl gallates, agitating until substantially all of the ester is dissolved, said second portion of edible oil being maintained at a temperature sufficiently high to dissolve the added ingredients but below the decomposition point of lecithin during said additions and agitations, and rapidly cooling said second solution; and combining about 66⅔% of the first solution with about 33⅓% of the second solution by adding one to the other and agitating until substantially complete uniformity is achieved, the temperature of the combined solutions being maintained between room temperature and about 128° F. during said agitation and the amount of free water present during the formation of the second solution and the combining of the first and second solutions being not greater than about 5%.

References Cited in the file of this patent
UNITED STATES PATENTS

| | | |
|---|---|---|
| 2,464,927 | Hall | Mar. 22, 1949 |
| 2,607,745 | Majaffin | Aug. 19, 1952 |

OTHER REFERENCES

Kraybill et al.: Jr. Am. Oil Chem. Soc., September 1949, pp. 1–5.